(12) United States Patent
Campus

(10) Patent No.: US 6,782,913 B2
(45) Date of Patent: *Aug. 31, 2004

(54) APPARATUS FOR USE OF SINGLE POINT WATERING SYSTEM WITH MONOBLOC LEAD-ACID BATTERIES

(75) Inventor: Daniel N. Campus, Grand Rapids, MI (US)

(73) Assignee: Flow-Rite Controls, Ltd., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/658,677

(22) Filed: Sep. 9, 2003

(65) Prior Publication Data

US 2004/0140005 A1 Jul. 22, 2004

Related U.S. Application Data

(63) Continuation-in-part of application No. 10/348,797, filed on Jan. 22, 2003, now Pat. No. 6,644,338.

(51) Int. Cl.[7] .................................................. F17D 1/00
(52) U.S. Cl. ....................................... 137/260; 137/266
(58) Field of Search .................................. 137/260, 266

(56) References Cited

U.S. PATENT DOCUMENTS

| | | | | | |
|---|---|---|---|---|---|
| 3,561,505 A | * | 2/1971 | Ryder | .......................... | 137/260 |
| 5,090,442 A | * | 2/1992 | Campau | ...................... | 137/260 |
| 5,832,946 A | * | 11/1998 | Campau | ...................... | 137/260 |
| 6,227,229 B1 | * | 5/2001 | Campau | ...................... | 137/260 |
| 6,338,368 B1 | * | 1/2002 | Hassell | ........................ | 137/260 |
| 6,431,201 B2 | * | 8/2002 | Chau | ........................... | 137/260 |
| 6,644,338 B1 | * | 11/2003 | Campau | ...................... | 137/260 |

* cited by examiner

Primary Examiner—Kevin Lee
(74) Attorney, Agent, or Firm—Niro, Scavone, Haller & Niro

(57) ABSTRACT

The present invention is directed to a single point watering system for refilling individual cells of a multi cell monobloc lead-acid battery wherein each battery cell is fitted with a refill control valve. The system includes a manifold and a swivel connector fitting. The manifold has (i) a plurality of outlet bosses positioned at a predetermined spacing to permit the manifold to be assembled to the battery with each outlet boss in sealed fluid communication with one of the refill control valves, (ii) at least one inlet port adapted to receive the swivel connector fitting, and (iii) a longitudinally extending passageway for fluid communication between the inlet port and each outlet boss. The swivel connector fitting has an outlet boss which is mounted within the manifold inlet port in sealed fluid communication and is rotatable within the inlet port through 360 degrees. The swivel connector fitting also includes ports to communicate with other components of the single point watering system.

7 Claims, 1 Drawing Sheet

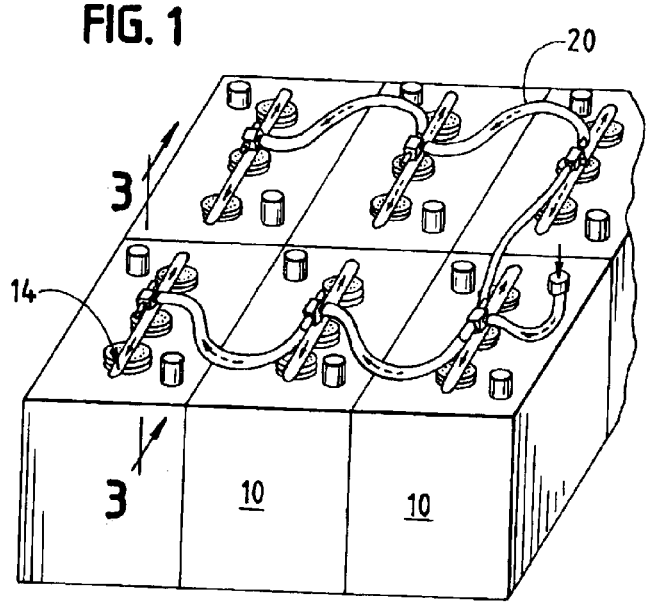
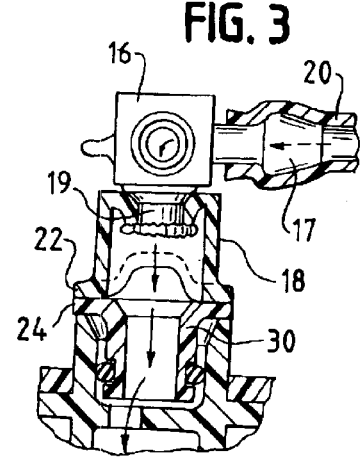
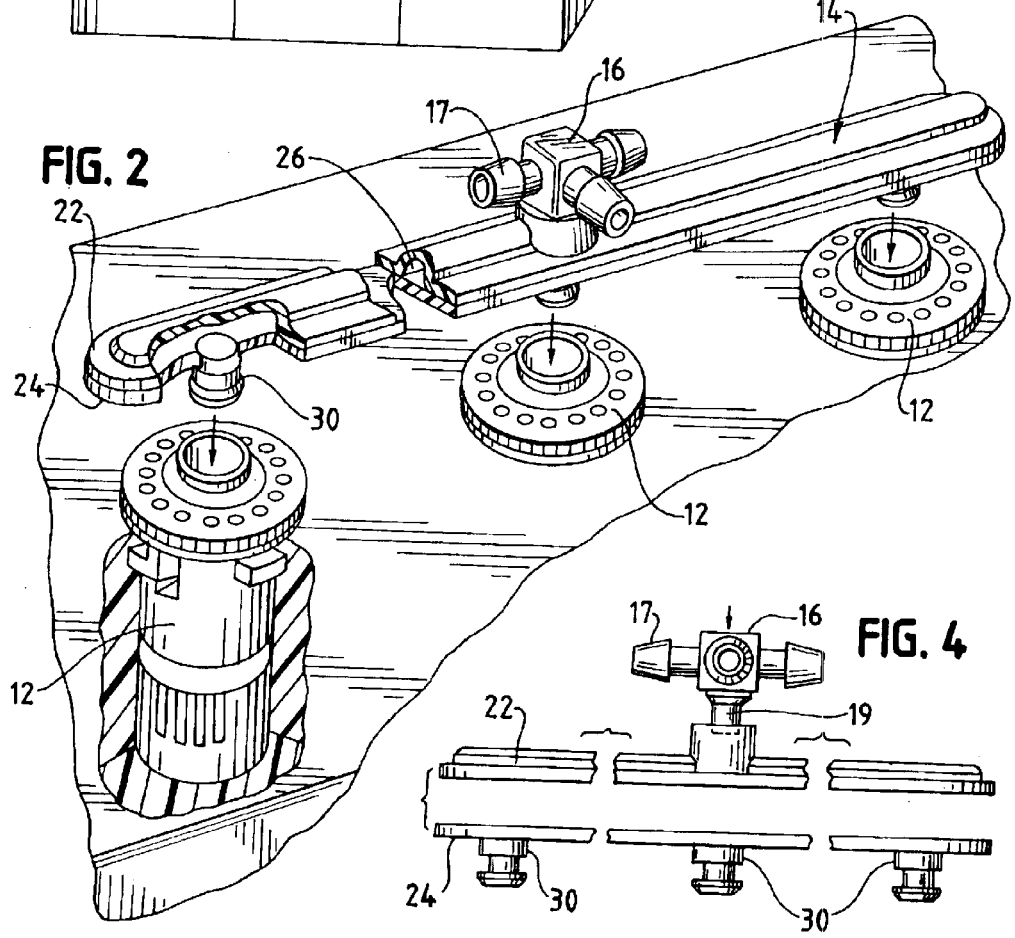
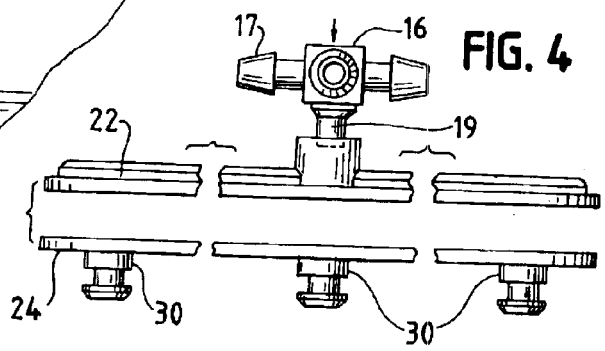

APPARATUS FOR USE OF SINGLE POINT WATERING SYSTEM WITH MONOBLOC LEAD-ACID BATTERIES

This application is a continuation in part of U.S. patent application Ser. No. 10/348,797 filed on Jan. 22, 2003, now U.S. Pat. No. 6,644,338.

BACKGROUND OF THE INVENTION

The present invention is directed to an improved apparatus for using single point watering systems. More particularly, the invention is directed to an improved apparatus for implementing single point watering systems in connection with monobloc lead-acid batteries.

Water is lost from the electrolyte in lead-acid batteries due to evaporation and hydrolysis, and must be replaced on a regular basis. Single point watering (SPW) systems are widely available for routinely adding water to lead-acid batteries. Advantages of SPW systems include improved battery life through more precise electrolyte level, substantial maintenance cost savings and significantly improved operator safety compared to manually watered batteries. SPW systems consist of individual refill valves (such as that disclosed in U.S. Pat. No. 6,227,229), one mounted in each battery cell, with all valves interconnected by means of tubing. A single water inlet at a point in the tubing network allows water to flow into all cells until the refill valves automatically shut off the flow into each cell as the electrolyte level set point is reached. The problems with SPW systems are generally associated with installation and maintenance of the valve and tubing network on the tops of the batteries. Various prior art patents have dealt with problems associated with deterioration of tubing due to attack by acid (U.S. Pat. No. 5,284,176) and damage to SPW system components due to battery handling (U.S. Pat. No. 5,832,946). This invention deals with the problems and expense related to installation.

Installation of a typical tubing network for SPW systems is not without difficulty. In most cases, installation is performed by trained personnel who know how to route, cut and attach tubing to each valve. If the tubing is routed incorrectly, it can kink, blocking flow into one or more cells. If the tubing is cut to the incorrect length, or attached to the valve incorrectly, it can leak or blow off during the watering operation. If not detected, cells can become under filled or overfilled, and cell damage or acid damage to surrounding structure can occur. In addition to the difficulty of doing it correctly, installation is time consuming. It can take several minutes, up to as much as thirty minutes, per battery to install a system, which adds a substantial labor expense as a battery fleet may often consist of hundreds of batteries. Battery service organizations, which sell and install SPW systems, may not have sufficient personnel to meet the installation schedule requirements of larger customers.

The expense and problems caused by SPW system installation, limit the appeal of the product to many customers, who are looking for the lowest maintenance cost solution to their battery needs. Wet cell lead-acid batteries, which require regular watering are the most economical when compared to alternative technologies. However, in many cases, high battery maintenance cost drives customers to so-called maintenance free type batteries which do not require watering at all. Battery watering costs are often high enough so that users are willing to pay a premium for these batteries, and for their more expensive charging equipment.

The optimum solution to this long felt problem would reduce the time and skill required to manufacture, install and maintain an SPW system, and provide a standardized SPW system product that would be adaptable to a wide array of battery configurations, allowing installers to quickly mount the same SPW system product on all the batteries in a fleet regardless of battery configuration differences.

Monobloc batteries consist of several cells housed in the same plastic case. Normally these batteries are used in multiple quantities and in many different arrangements in golf cars, scrubbers, scissor lifts and other mobile equipment. The spacing and orientation of monobloc batteries vary widely between applications and equipment brands. Although there is a strongly felt need for SPW on these types of batteries, SPW systems are not widely used due to the relatively high cost. Installation labor is the most significant factor in the total cost, preventing more widespread use.

SUMMARY OF THE INVENTION

The present invention is directed to a single point watering system for refilling individual cells of a multi cell monobloc lead-acid battery wherein each battery cell is fitted with a refill control valve. The system includes a manifold and a multi-port connector fitting. The manifold has (i) a plurality of outlet bosses positioned at a predetermined spacing to permit the manifold to be assembled to the battery with each outlet boss in sealed fluid communication with one of the refill control valves, (ii) at least one inlet port adapted to receive the multi-port connector fitting, and (iii) a longitudinally extending passageway for fluid communication between the inlet port and each outlet boss. The multi-port connector fitting has an outlet boss which is mounted in sealed fluid communication and within the manifold inlet port and is mounted in fixed position or is rotatable within the inlet port. The multi-port connector fitting also includes ports to communicate with other components of the single point watering system.

BRIEF DESCRIPTION OF THE DRAWINGS

These and other features, objects, and advantages of the present invention will become apparent from the following description of the drawings wherein like reference numerals represent like elements in the several views, and in which:

FIG. 1 is a perspective view illustrating the use of the apparatus of the present invention as installed with an exemplary array of monobloc lead-acid batteries;

FIG. 2 is an enlarged and exploded perspective view of the apparatus of FIG. 1;

FIG. 3 is a partial non-sectional view taken along line 3—3 of FIG. 1; and

FIG. 4 is an exploded side elevational view showing details of construction of the apparatus illustrated in FIG. 1.

DETAILED DESCRIPTION OF THE PREFERRED EMBODIMENTS

With reference to FIGS. 1-3, an array of monobloc lead-acid batteries 10 is shown, each having three cells capped by a refill control valve 12. In accordance with the present invention the refill control valves 12 associated with the three cells of the monobloc battery 10 are coupled to a single manifold 14 which, when used as described below, lowers the installation costs of the SPW system to a practical and attractive level.

The manifold 14 is rigid. It is designed to snap onto the refill valves 12 located in the cells of the monobloc battery. It has a single three port connector, fitting 16, which is assembled into a socket or inlet port 18 on the top of the manifold to interconnect the various manifolds mounted on other monoblocs in the system, and to connect to a water supply. The connector fitting 16, in the preferred embodiment, is a swivel connector and features a single barb on each of the three ports. This allows the installer to simply push on a section of flexible tubing 20 between the manifolds, without the need for tube clamps. Labor is reduced to the simple task of:

a) installing a refill valve into each cell;
b) snapping on the manifold on each battery;
c) interconnecting the manifolds with sections of tubing by pushing the end of the tube over the barbed connector;
d) installing a cap over the unused ports on the swivel connectors by pushing it over the barbed connector;
e) connecting a water supply tube to one of the swivel connector ports by pushing the end of the tube over the barbed connector and pushing the other end of the tube over the bard on a quick coupler.

All of this can be done in a matter of minutes per system.

The preferred manifold design that reduces overall system cost consists of two plastic components, an upper housing 22 and lower housing 24, as shown in FIG. 4. Housings' 22 and 24 may be joined by ultrasonic welding or other assembly techniques well known to those of skill in the art. The upper housing 22 has a channel 26 which extends longitudinally, connecting the inlet port 18 with each of the outlet ports or bosses 30 that depend from the lower housing 24. The lower housing has the number of outlet ports, spaced as required, for the particular type of monobloc battery. Three or four ports are common. The parts can be molded in a variety of plastics suitable for use on batteries, such as polypropylene, ABS, polycarbonate, etc. The long length, typically about 8 inches, makes ABS a particularly good choice because it is the easiest to ultrasonically weld. The upper manifold housing inlet port 18 has a socket with a reverse taper for retaining fittings, while allowing 360 degrees of rotation. The snap-in bosses on the lower manifold housing and the swivel connector are the same size and design and include O-rings to provide the necessary seals. The manifold makes it very easy to adapt SPW systems to many monobloc battery systems.

The swivel connector fitting 16 features two or more ports 17 for connecting via conduit 20 with other swivel connector fittings, or for attachment of a water inlet tube. Fitting 16 also has one port or boss 19 designed to snap into a socket, as previously described. The swivel connector can mount to the manifold socket or directly to the valve socket. Applications for the swivel connector fitting mounted directly to a refill valve 12 could occur in special situations where a rigid manifold may not fit or is unavailable. The fitting is especially useful in SPW systems using thermoplastic elastomer tubing having ¼ in. I.D. and 7/16 in O.D.

Another advantage of the present invention relates to the relatively small size of the manifold passageway formed by channel 26. Because this passageway is small, the volume of water retained in the network after a water filling cycle is reduced.

It is important to minimize the amount of water in the network to reduce the chance that cells will take on too much water causing acid to bubble out during the later stages of the charge cycle. This can occur if the volume in the network is too large. Each time the operator connects the pressurized water supply, the network fills with water. This happens even if the cells are already full and the valves are closed, because the water compresses the air in the network. This in-network water eventually drains into the cells as the vehicle is used due to bouncing and sloshing within the cell. This problem is compounded by the fact that the vehicle is not always on a flat plane, but goes up and down slopes, allowing some cells to absorb more of the water than other cells.

The manifold 14 is therefore designed to minimize the volume of water retained after the filling cycle is over. By comparison with the smallest volume tubing network system, the manifold system has 45.5% less retained water volume. The calculation is based on comparing systems installed on typical vehicle 48 volt (24 cell) battery arrays. The tubing network consists of 11 feet of ¼ inch I.D. tubing and 1 foot of ⅜ inch I.D. tubing for a total volume of 7.8 in$^3$. The manifold system consists of 6 feet of ¼ inch I.D. tubing and 46 inches of ⅛ inch square channel for a volume of 4.25 in$^3$. The difference is even greater for other watering systems that use ⅜ in. I.D. tubing, where volume is 15.9 in$^3$. Here the manifold system has 73% less volume.

The benefit of this lower volume is less likelihood of acid bubble out and less restriction on watering schedule and frequency.

It will be appreciated by those skilled in the art that various changes and modifications can be made to the illustrated embodiments without departing from the spirit of the present invention. All such modifications and changes are intended to be covered by the appended claims.

I claim:

1. In a single point watering system for refilling individual cells of a multi cell monobloc lead-acid battery wherein each cell includes an access port having a refill control valve mounted therein, the improvement comprising:

a generally linear and rigid manifold having (i) a plurality of depending outlet bosses with a predetermined spacing to permit the manifold to be assembled to the battery with each outlet boss in sealed relationship with one of the refill control valves, (ii) at least one inlet port adapted to receive a multi-port connector fitting, and (iii) a longitudinally extending passageway permitting fluid communication between the inlet port and each outlet boss; and wherein the multi-port connector fitting includes an outlet boss which is inserted into the manifold inlet port in sealed relationship within said inlet port, the multi-port connector fitting also including ports to communicate with other components of the single point watering system.

2. The improved single point watering system of claim 1 wherein the manifold outlet bosses are press fit onto the refill control valves.

3. The improved single point watering system of claim 1 wherein the multi-port connector fitting outlet boss is press fit onto the manifold inlet port.

4. The improved single point watering system of claim 1 wherein the manifold outlet bosses and the multi-port connector fitting outlet boss are the same size and configuration.

5. The improved single point watering system of claim 1 wherein the manifold comprises an upper housing having an elongated channel with said inlet port extending from the channel through the upper housing, and a lower housing with each of the outlet bosses depending from the lower housing.

6. The improved single point watering system of claim 1 wherein an array of monobloc lead-acid batteries is serviced by the system with a manifold and multi-port connector fitting associated with the batteries, and wherein a flexible conduit is connected to each multi-port connector fitting of adjacent batteries in the array to interconnect the single point watering system.

7. The improved single point watering system of claim 1 wherein the multiport connector fitting is rotatable within the inlet port of said manifold.

* * * * *